United States Patent
Cleasby et al.

(10) Patent No.: US 7,032,167 B1
(45) Date of Patent: Apr. 18, 2006

(54) METHOD AND APPARATUS FOR A DOCUMENT PARSER SPECIFICATION

(75) Inventors: Andrew Cleasby, Marblehead, MA (US); Ryan Schuft, Woburn, MA (US)

(73) Assignee: Cisco Technology, Inc., San Jose, CA (US)

( * ) Notice: Subject to any disclaimer, the term of this patent is extended or adjusted under 35 U.S.C. 154(b) by 706 days.

(21) Appl. No.: 10/077,241

(22) Filed: Feb. 14, 2002

(51) Int. Cl.
*G06F 17/00* (2006.01)

(52) U.S. Cl. ............... 715/500; 707/6; 704/9
(58) Field of Classification Search ........ 715/513, 715/530, 500; 707/4, 6; 704/9
See application file for complete search history.

(56) References Cited

U.S. PATENT DOCUMENTS

| | | | |
|---|---|---|---|
| 5,963,894 A * | 10/1999 | Richardson et al. ........ 704/9 |
| 6,138,098 A * | 10/2000 | Shieber et al. ............. 704/257 |
| 6,223,150 B1 * | 4/2001 | Duan et al. .................. 704/9 |
| 6,342,907 B1 | 1/2002 | Petty et al. ................. 345/762 |
| 6,404,445 B1 | 6/2002 | Galea et al. ................. 345/853 |
| 6,430,624 B1 | 8/2002 | Jamtgaard et al. ......... 709/246 |
| 6,535,896 B1 | 3/2003 | Britton et al. .............. 707/523 |
| 6,539,348 B1 * | 3/2003 | Bond et al. .................. 704/9 |
| 6,638,315 B1 | 10/2003 | Uppiano et al. ............. 715/513 |
| 6,714,905 B1 * | 3/2004 | Chang et al. ................ 704/9 |
| 6,745,181 B1 * | 6/2004 | Chang et al. ................ 707/4 |
| 6,763,382 B1 | 7/2004 | Balakrishnan et al. ..... 709/224 |
| 6,829,745 B1 | 12/2004 | Yassin et al. ............... 715/513 |
| 6,886,115 B1 * | 4/2005 | Kondoh et al. .............. 714/52 |
| 2002/0032709 A1 * | 3/2002 | Gessner ..................... 707/540 |

* cited by examiner

*Primary Examiner*—Sanjiv Shah
(74) *Attorney, Agent, or Firm*—Sierra Patent Group, Ltd.

(57) ABSTRACT

The present disclosure presents a system for parsing based upon content type, and provides a content-rich set of parsing rules that can be optimized for a wide variety of applications. The present system also recognizes different types of content in addition to text, such as behaviors, and associates rules to parse a wide variety of content.

18 Claims, 2 Drawing Sheets

METHOD AND APPARATUS FOR A DOCUMENT PARSER SPECIFICATION

BACKGROUND

1. Field of the Invention

The disclosure relates generally to data communications, and in particular, to a document parser specification that provides enhanced customization.

2. The Prior Art

BACKGROUND

Upstream Proxy servers are known in the art and provide an interface between a web client and a server by making requests on the client's behalf and modifying the content that is received before it is presented back to the client. Upstream proxy servers enable browsers to make normal requests to the proxy, which then makes the request from the content server. One application in which proxy servers are useful is a real-time web collaboration environment, where multiple clients are viewing the same cached page that must be dynamically updated, such as a page presenting stock quotes.

As is known by those of ordinary skill in the art, upstream proxy servers are to be distinguished from a "transparent" HTTP proxy, which is recognized specifically as a proxy server by the browser, allowing requests to be submitted in a different fashion. The user of a transparent proxy never sees a difference in the page they receive, i.e., the links are not modified.

One issue with upstream proxy servers is that any links that appear on pages must link back to the proxy server, and not the actual source of the content. To accomplish this, typical proxy servers must perform parsing on the web content prior to presenting the content to the requesting users. Parsing typically involves downloading the requested content, parsing the content to find any embedded links, modifying the links to point back to the proxy server rather than the content source, perform any further content transformation necessary, and then forward the content to the requesting client.

A further challenge to parsing is the increasing use of Java script pages, which allow the generation of web pages dynamically within the receiving client's web browser. Such pages may generate their own links within the browser page which must be parsed and re-directed to the proxy server.

Typically, such parsing routines are hard-coded as procedures provided with a specific product, and are not easily extensible or modified.

SUMMARY

This disclosure presents a system for parsing based upon content type, and provides a content-rich set of parsing rules that can be optimized for a wide variety of applications. The present system also recognizes different types of content in addition to text, such as behaviors, and associates rules to parse a wide variety of content. These rules specify the appropriate action that must be performed on the content to successfully parse the content. Such a format is very extensible, and provides a basis for allowing modifications to the parsing routines in the field, such as by third-parties.

BRIEF DESCRIPTION OF THE DRAWING FIGURES

DETAILED DESCRIPTION

Figure 1:
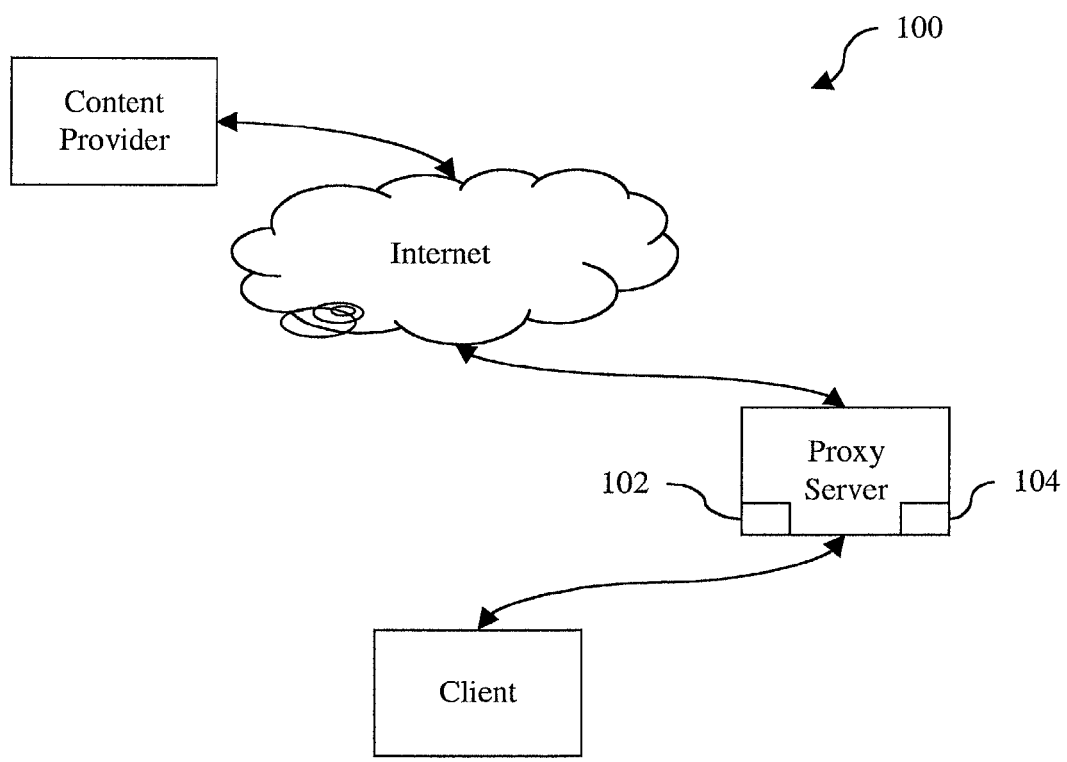
FIG. 1 is a diagram of a data communication system including a proxy server configured in accordance with this disclosure.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

FIG. 1 is a diagram of a proxy server system 100 configured in accordance with the teachings of this disclosure. The system 100 includes a content server for providing content to the Internet. The system 100 also includes a client that is coupled to the Internet through a proxy server. The proxy server may include memory 102 and a processor 104 as is known in the art for the storage, retrieval, and execution of embodiments of this disclosure. The proxy server contains a parser that is configured to parse content requested by the client in accordance with the teachings of this disclosure as will be described in more detail below.

In one aspect of this disclosure, the parser of this disclosure is contained in an XML file that contains the parser structure and behavior. The server may read this file and build the parser upon startup.

It is contemplated that the parser may adhere to a specific structure, which may then be used to determine structure of the parser at runtime. In one aspect, when instantiated, a tree-like structure representing the various configured parsers may be created. The structure reflects the hierarchical relationships between configured parsers, and is used to select the appropriate parser for a single request at parse-time. Additionally, the parser may contain script that may be executed during document reformatting to precisely control the reformatting process.

The parser of this disclosure introduces an element known as a metamatch. As the server initializes, it builds the metamatch element. The metamatch element contains one or more parsing objects, known as metamatch objects. Each metamatch object may contain one or more rule objects for parsing individual types of content, or sources of content. Thus, depending on the types of rules in a particular metamatch, metamatches may be optimized to parse a page from a particular source, or be more general and optimized to parse only a specific type of content. When constructed using a flexible language such as XML, many metamatch objects can be defined, and the metamatches may be related to each other in a hierarchal fashion as is known in the art. By so organizing the metamatches in a hierarchy, when a request comes in from a parser, the proxy server may walk through the metamatches to determine which rule applies to the content that needs to be parsed.

Additionally, as the metamatch element is built upon constituent metamatch objects, more specialized metamatch objects can reside alongside more general metamatches, with the more specialized objects inheriting some of the behavior from the more generalized objects.

The metamatch element may also contain an attribute that used to identify the most appropriate rule to parse content with as parsing requests are received.

In one aspect of this disclosure, the metamatch object comprises an object in Java. It has several attributes, such as the protocol, host, port, path, and contenttype, including comma separated lists of respective portions of the inbound request's meta data (the requested URL, the document type, etc). These may be used when linking a metamatch object with a metasearch object, allowing the parser to branch through the trees of rules.

Rule objects may also be defined in XML. The rule objects may contain an attribute that is a comma separated list of rule names which should be excluded from the tree that the rule exists in. This allows rules to override rules that were inherited from a parent metamatch object. Additionally, rules may override or deprecate other rules. Deprecated rules are effectively deleted from the metamatch that is created with the new Rule.

Figure 2:
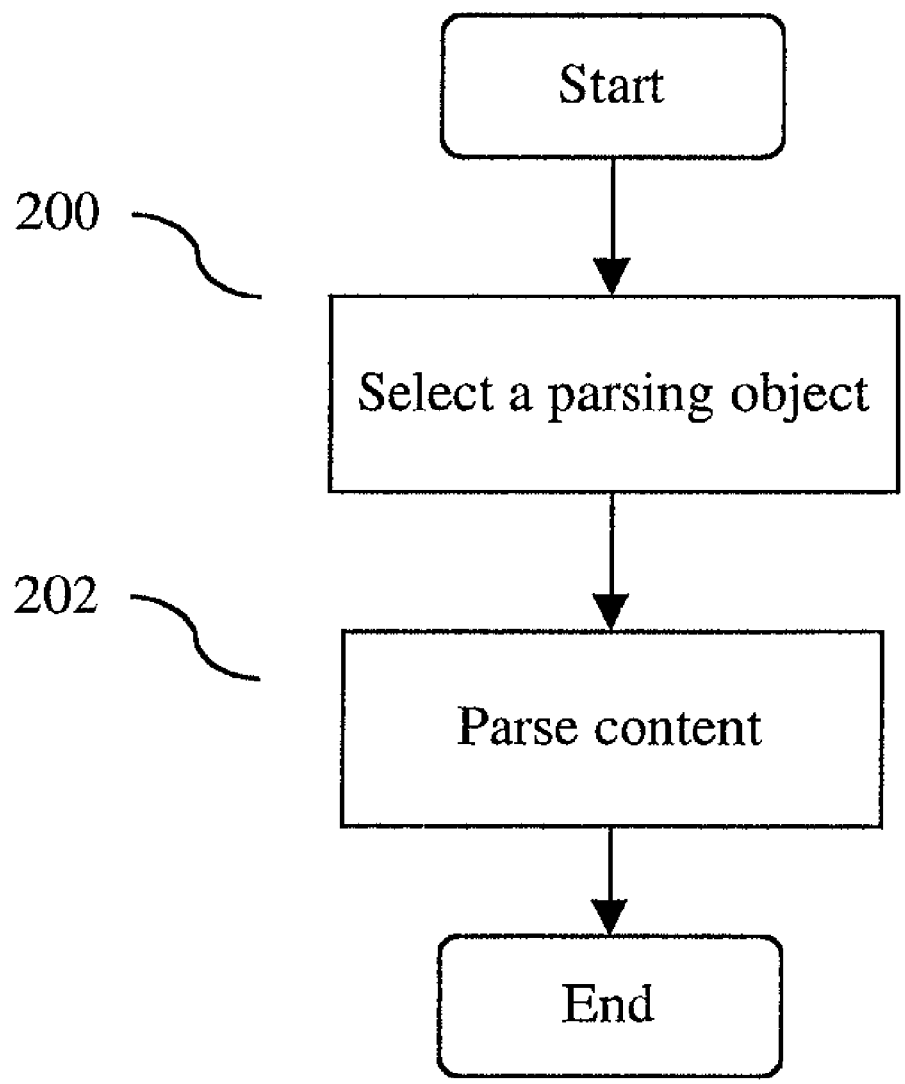
FIG. 2 is a flow diagram of parsing received content in accordance with the teachings of this disclosure.

FIG. 2 is flow diagram of a parsing method in accordance with this disclosure. In performing the parsing, it will be assumed that the parser is built after the server initializes as mentioned above. After a request is made by the client, content arrives at the proxy server, initiating the parsing process.

Moving first to act 200, a metamatch object is selected that best applies to the received content. This may be accomplished using the parsing expression as described above.

After the selected metamatch object is identified, the content may be parsed in act 202. In one aspect, the content may be parsed in two steps.

The content may be first broken down into smaller pieces of text using one or more rule regular expressions. All expressions are combined into a large top-level expression, with one top-level expression being associated with a metamatch. In one aspect, the parsing process works by repeatedly applying the regular expression to the input, looking for the first best match in the input each time, then continuing from the end of the last match, until the end of the input is reached. The text is divided into fragments, with some fragments being text that matched a specific Rule, other fragments being the text in between matched fragments. In a further aspect, the text is only parsed once, after which the appropriate Rule scripts may act on it.

These smaller text objects may then be parsed according to the expressions in the rule objects contained in the selected metamatch object. The result of this process is a tree structure containing the parser rules and their associated text object. The process may then move to act 206, where the proxy server iterates through the tree, executing the rules and reformatting the document. As each rule is executed, an associated rule script may be called and executed to reformat the content.

In a further aspect, various Rule scripts are provided which can execute at several different points in the parsing/reformatting process. For example, there are onBeforeParse, onAfterParse, onBeforeRender, and onAfterRender scripts available at the metamatch level. At the Rule level, there are onMatch and onRender scripts. It is contemplated that most reformatting may be done at the Rule-level onRender script, where, for example, a link is reformatted to point to the proxy server. For some HTML tag types, like a Base Href, an onMatch script is necessary to dynamically affect the parsing behavior as the document is being parsed.

Finally, the parsed objects may be written out into an output document. The output document may then be flattened out into a string and sent out to the client.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method of parsing content comprising:

receiving content to be parsed;

selecting a parsing object corresponding to said received content, parsing object containing at least one parsing rule having at least one expression;

generating a top level expression wherein said level expression includes at least one of said at least one expressions;

applying said top level content to said received content to determine a first best match to said expression from said received content;

dividing said received content into a plurality of fragments of text, wherein at least one of said plurality of fragments comprise text matching a specific one of said at lease one parsing rule; and parsing said fragments of said received content according to each said at least one parsing rule in said parsing object.

2. The method of claim 1, further including the act of defining a tree structure containing said at least one parsing rules and their associated text object.

3. The method of claim 2, further including the acts of iterating through said tree; executing said rules; and reformatting said received content.

4. The method of claim 3, wherein as each said rule is executed, an associated rule script is called and executed to reformat said received content.

5. The method of claim 4, where said rule scripts may be executed at predetermined points in the reformatting process.

6. The method of claim 4, where said rule scripts may be executed at predetermined points in the parsing process.

7. A program storage device readable by a machine, tangibly embodying a program of instructions executable by the machine to perform a method of parsing content, said method comprising:

receiving content to be parsed;

selecting a parsing object corresponding to said received content, parsing object containing at least one parsing rule having at least one expression;

generating a top level expression wherein said level expression includes at least one of said at least one expressions;

applying said top level content to said received content to determine a first best match to said expression from said received content;

dividing said received content into a plurality of fragments of text, wherein at least one of said plurality of fragments comprise text matching a specific one of said at lease one parsing rule; and parsing said fragments of said received content according to each said at least one parsing rule in said parsing object.

8. The device of claim 7, the method further including the act of defining a tree structure containing said at least one parsing rules and their associated text object.

9. The device of claim 8, the method further including the acts of iterating through said tree; executing said rules; and reformatting said received content.

10. The device of claim 9, wherein as each said rule is executed, an associated rule script is called and executed to reformat said received content.

11. The device of claim 10, where said rule scripts may be executed at predetermined points in the reformatting process.

12. The device of claim 10, wherein said rule scripts may be executed at predetermined points in the parsing process.

13. An apparatus for parsing content comprising:

means for receiving content to be parsed;

means for selecting a parsing object corresponding to said received content, parsing object containing at least one parsing rule having at least one expression;

means for generating a top level expression wherein said level expression includes at least one of said at least one expressions;

means for applying said top level content to said received content to determine a first best match to said expression from said received content;

means for dividing said received content into a plurality of fragments of text, wherein at least one of said plurality of fragments comprise text matching a specific one of said at lease one parsing rule; and means for parsing said fragments of said received content according to each said at least one parsing rule in said parsing object.

14. The apparatus of claim 13, further including means for defining a tree structure containing said at least one parsing rules and their associated text object.

15. The apparatus of claim 14, further including means for iterating through said tree; means for executing said rules; and means for reformatting said received content.

16. The apparatus of claim 15, further including means for calling and executing an associated rule script to reformat said received content.

17. The apparatus of claim 16, where said rule scripts may be executed at predetermined points in the reformatting process.

18. The apparatus of claim 16, where said rule scripts may be executed at predetermined points in the parsing process.

* * * * *